UNITED STATES PATENT OFFICE.

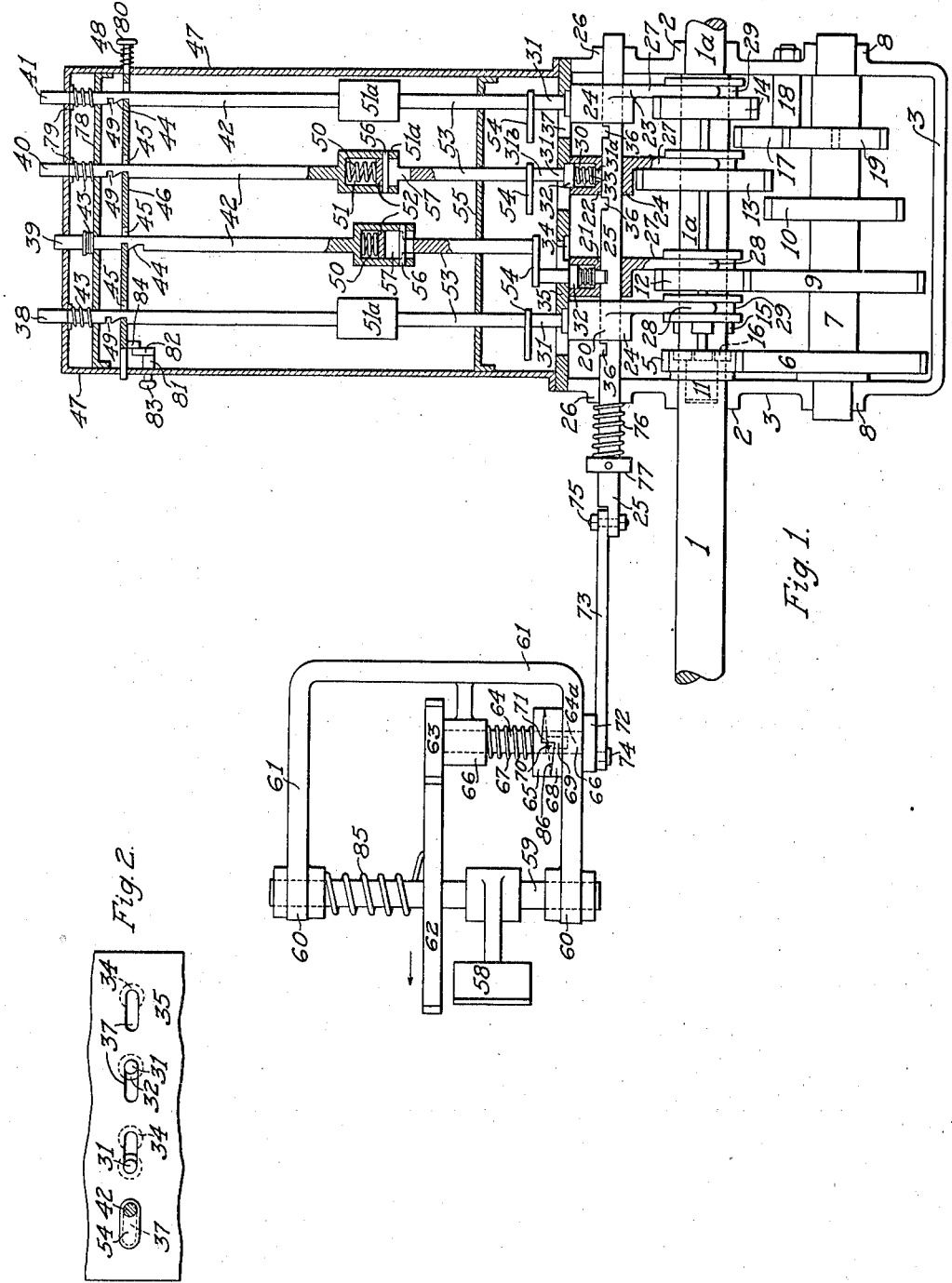

MERION J. HUGGINS, OF NEW YORK, N. Y., ASSIGNOR TO AUTOMOTIVE DEVELOPMENT CO., INC., OF NEW YORK, N. Y., A CORPORATION OF NEW YORK.

SPEED-CONTROLLING MECHANISM FOR AUTOMOBILES.

1,313,535.     Specification of Letters Patent.     Patented Aug. 19, 1919.

Application filed May 23, 1914. Serial No. 840,533.

*To all whom it may concern:*

Be it known that I, MERION J. HUGGINS, a citizen of the United States, and resident of the city of New York, in the county of Kings and State of New York, have invented certain new and useful Improvements in Speed-Controlling Mechanism for Automobiles, of which the following is a specification.

This invention relates to automobiles, particularly to the speed controlling mechanism thereof, and its principal object is to provide simple, efficient, reliable, and improved means for controlling the speed of the automobile and for driving the automobile wheels at a variable speed relatively to the speed of the engine or prime mover.

Another object is to provide improved, conveniently operated, and readily responsive means for controlling the changing of the speeds and reversing of the wheels.

Other objects and advantages will hereinafter appear.

In the accompanying drawings,—

Figure 1 is a general view, partly in section and partly in full, showing the speed controlling mechanism and a plan view of an automobile gear transmission, with which the invention is here shown as adapted.

Fig. 2 shows a fragmentary plan view of a detail of said mechanism.

A shaft 1, driven by the automobile engine, not shown, is mounted in bearings 2 of the gear casing 3. The shaft 1 carries a gear 5 which drives a gear 6 that is keyed upon and drives a countershaft 7 mounted in bearings 8 of said casing. Said countershaft carries drive-gears 9 and 10 of different sizes, and the rear shaft-section $1^a$ of the drive shaft, split from shaft-section 1 at 11 and running independently thereof, carries coöperating transmission gears 12, 13, and 14 splined to shift thereupon, so that any one of said transmission gears may be caused to mesh with and unmesh from its coöperating drive gear on said countershaft, and various speeds may be thereby transmitted to the shaft $1^a$, which in turn drives the wheels of the automobile at various speeds. Thus when the gears 12, 13, 14 are all unmeshed, the countershaft 7 driven by gears 5, 6 from shaft 1 runs idly and no motion is transmitted to the shaft-section $1^a$, and when gears 13, 10 are meshed a slow speed is imparted to the shaft $1^a$. Likewise, when the gears 12, 9 are meshed, as shown in the drawing, a higher speed is transmitted to shaft $1^a$, and when a clutch-member 15 splined upon shaft $1^a$ is shifted to engage with a coöperating clutch-member 16 formed in gear 5 the shaft $1^a$ is driven at highest speed, directly from shaft 1. In order to rotate the shaft $1^a$ oppositely for reversing the automobile wheels, the gear 14 is meshed with an intermediate idler-gear 17, which is mounted on a stud 18 fixed to casing 3 and is driven by a drive-gear 19 carried upon the countershaft 7. The gears are meshed and unmeshed by means of shifting devices 20, 21, 22, and 23, which comprise hubs 24 carried upon a rod 25 mounted in guiding lugs 26 of casing 3, arms 27 extending from said hubs, and forked portions 28 at the extremities of said arms that embrace shouldered collars 29. of the shiftable gears and the clutch-member 15.

Within a cavity 30 in the hub 24 of each shifting device is located a locking latch consisting of a pin 31 having a flange 32, and a spring 33 surrounding said pin within cavity 30 presses normally against said flange and lodges it within a receiving recess 34 formed in a plate 35 secured to the casing 3, whereby the shifting device is firmly maintained locked, and shifting thereof prevented, while the gear carried thereby is maintained unmeshed. The rod 25 is shiftable longitudinally toward the right and back toward the left, as viewed in the drawing, through the guiding lugs 26 and the hubs 24 of the shifting devices 20, 21, 22, 23, and a simultaneous stroke or to and fro movement is imparted to said rod, first forwardly from the initial position shown toward the right and then immediately backward to the initial position. In the rod 25 are formed notches 36 which register with the pins 31 when said rod is at the end of the forward portion of its stroke, and upon pressing down any one of the pins 31, contrary to spring 33, toward said rod just before it is shifted the pin-flange 32 is caused to leave the recess 34 in plate 35 and the lower portion $31^a$ of said pin is compelled to enter its registering notch 36 in rod 25, whereby the particular shifting device carrying said pin is thus unlocked from the plate 35 and locked firmly to the rod 25. And hence, upon the backward portion of the stroke of rod 25 said locked shifting device is carried therewith and shifted toward the left, as viewed in the drawing, and the transmission gear carried by this shifting device is thereby shifted and meshed with its coöperating drive-gear upon shaft 7. Conversely, during the forward portion of a subsequent stroke of the rod 25 the shifting device previously locked thereto is shifted back toward the right and the spring 33 pressing the flange 32 of the pin 31 carried by said device causes the flange to reënter its recess 34, whereby the shifting device is restored to initial locked position and the gear carried thereby is unmeshed. Upon the backward portion of its stroke the rod 25 either returns idly or together with any one of the other shifting devices that may have been locked thereto. During the movement of the shifting device its pin 31 is carried along therewith and the lower portion 31$^a$ of the pin is maintained within notch 36 by the plate 35 bearing upon flange 32 of the pin, the upper portion 31$^b$ of said pin protruding through an elongated slot 37 in plate 35, Figs. 1 and 2.

In the operation of the gear transmission any one of a set of buttons 38, 39, 40 and 41 may be pressed, according to whichever coöperating pair of gears it is desired to mesh in the selection of speeds for the automobile wheels. The buttons 38, 39, 40, 41 operate respective selecting devices which serve to effect the aforesaid locking and unlocking of the shifting devices 20, 21, 22, 23 respectively, and we will assume that the button 39 has been pressed, as shown in the drawing. This depresses an operating rod 42, of which said button constitutes the upper extremity, contrary to the pressure of a spring 43, and causes a bevel portion 44 of said rod to pass through an aperture 45 of a plate 46 which is mounted in a casing 47 to shift longitudinally and transversely to the rods 42. The plate 46 is continually pressed against the bevel portion 44 by a spring 48, and said bevel portion in descending shifts said plate contrary to the pressure of spring 48, whereby the pressing edge of said aperture 45 is caused to enter within a notch 49 of the rod and thereby maintain the rod with its button-extremity 39 locked in depressed position. The depression of rod 42 compresses a spring 50 contained within a cavity 51 provided in the lower extremity 51$^a$ of said rod, and this spring in turn presses against the upper extremity 52 of a leg 53 having a shoe 54 at its lower extremity, whereby the shoe is caused to bear against the pin 31 of the shifting device 21 and exert pressure of the lower extremity 31$^a$ of the pin against the rod 25, which pressure continues to be maintained while said rod 42 is held in locked depressed position. The leg 53 is guided in its longitudinal movement by a plate 55 secured to casing 47, and its extremity 52 is slidable within the cavity 51, a pin 56 secured to extremity 51$^a$ of rod 42 and passing through an elongated slot 57 in extremity 52 maintaining said extremities in proper relation.

The remaining step in the operation of selecting a particular speed is to press a pedal 58, which is preferably the usual pedal that operates the engine-shaft clutch, not shown. Said pedal is keyed upon a shaft 59 rotatably mounted in bearings 60 of a frame 61 secured to the machine, and pressing of the pedal rotates partially a gear 62 carried upon said shaft in the direction of the arrow. A gear 63 keyed upon a rotatable countershaft 64 meshes with gear 62 and thereby imparts a single rotation to said countershaft, which in turn transmits a single revolution to a plate formed with ratchet-like teeth to constitute a ratchet 65 splined thereupon, the countershaft 64 running parallelly to shaft 59 and being mounted in bearings 66 of frame 61. The plate or ratchet 65 is pressed by a spring 67 against a coöperating similar cam-plate or ratchet 68 keyed upon a countershaft-portion 64$^a$ which is split from countershaft 64 at 69, whereby the cam-plate 65 in turning carries the cam-plate 68 therewith, by engaging it at their meeting edges 70, 71 and imparts a single revolution to a crank-plate 72 fixed upon the countershaft-portion 64$^a$. A connecting-rod 73 is joined to the crank-plate 72 by means of a crank-pin 74 and to the extremity of rod 25 by means of a stud 75, and hence upon the revolution of said crank-plate a simultaneous forward and backward stroke of the rods 75 and 23 takes place. At the end of the forward portion of said stroke the pin 31, which had previously been set by button 39 to press against the rod 25, enters its registering notch 36 and thereby locks the shifting device 21 to said rod, whereupon the rod 25 in returning upon the backward portion of its stroke toward the left carries the device 21 therewith and shifting it with the gear 12 carried thereby meshes the gears 12, 9, as shown in the drawing. A spring 76 surrounding the rod 25 and disposed between the lug 26 and a collar 77 fixed upon said rod is compressed by said collar during the forward movement of rod 25. When the crank passes the center the spring and rod are freed and the rod is permitted to make a backward movement which it does under the operation of the spring free and uncontrolled by the means which operate to compress the spring. The return movement of the rod or its movement in a backward direction to mesh the gears is thereby in the nature of a snap movement. As will be seen the actual meshing of the gears, therefore, is performed solely by the action of the spring and is free and uncontrolled by the pedal or the connecting devices by which the latter is caused to operate upon the spring to compress the same. The spring 76 also serves to positively maintain the shifted gear in place and prevents accidental unmeshing thereof. It will be evident that the entire above-described operation, of selecting and shifting the gears, is momentarily performed, requiring on the part of the operator merely the pressing of the button 39 and pressing of the pedal 58.

Should it be desired to unmesh the gears 12, 9 and to mesh any other coöperating pair of gears such as the gears 13, 10 for low speed, the button 40 corresponding to such selection of speed may be pressed. The pressing of said button sets the pin 31 of shifting device 22 to press against the rod 25. While depressing said button, the rod 42 controlled thereby causes its beveled edge 44 to shift the plate 46 so that the edge of its aperture 45 leaves the notch 49 of the rod 42 controlled by the button 39 that was previously pressed and was held with its rod in locked depressed position. The button 39 being thus liberated its rod 42 and the parts dependent therewith are returned to normal position by the upward pressure of the spring 43, located between a guiding plate 78 and a pin 79 passing through said rod. After pressing button 40 the pedal 58 is first released and then pressed, which transmits a simultaneous forward and backward stroke to the rod 25, and upon the forward portion of said stroke the shifting device 21 locked to said rod is shifted thereby back and restored to locked normal position, and the gears 12, 9 are thus unmeshed. At the end of the forward portion of said stroke the shifting device 22 is locked to the rod 25, and upon the backward movement of the rod said device and its gear 13 are shifted therewith toward the left and the gears 13, 10 meshed.

It will be seen by following the drawing, that in a similar manner the pressing of button 38 and the pedal 58 will first unmesh and neutralize any coöperating pair of gears that may be meshed, and will set the selecting device controlled by said button to lock the shifting device 20 to rod 25 and will move said device to mesh the clutch-members 15, 16. Likewise, pressing button 41 and said pedal will actuate the mechanism to mesh the gears 14, 17 for reversing the automobile wheels.

If it is desired to unmesh or neutralize any coöperating pair of gears without moving any one of the remaining shifting devices, the plate 46 may be shifted toward the right by pressing a button 80 thereof contrary to spring 48, whereby any controlling button that may be held by said plate in depressed position is thus released and restored to normal position, so that upon pressing the pedal 58 the shifting device which had been locked thereto is restored to normal position and its gear unmeshed. A suitable lock 81 is secured to the casing 47, the lock-bolt 82 of which may be set and locked, by a key 83 in the automobile owner's possession, in the path of a lug 84 forming part of plate 46; and movement of said plate being thus prevented, it in turn prevents manipulation of the buttons 38, 39, 40, 41 and movement of the shifting devices 20, 21, 22, 23, by which means the owner may prevent unauthorized driving of his automobile in his absence.

The pedal 58 in being released is swung back by the clutch operating spring, not shown, or by means of a spring 85 rotating the gear 62 with the shaft 59 in a direction opposite to that shown by the arrow, said spring being secured to said gear end to the bearing 60. Said gear thereupon rotates the gear 63 with the shaft 64, and the cam-plate 65 is thereby turned for one revolution backwardly without affecting its coöperating cam-plate 68, whereby the backward swinging of said pedal does not affect the shiftable rod 25. During the backward revolution of cam-plate 65 it moves away from cam-plate 68, contrary to pressure of spring 67, through the action of cam. surfaces 86, and the edge 70 moving away from the edge 71 is restored by said spring at the end of the revolution to the normal position shown, ready to actuate the cam-plate 68 and rod 25 upon subsequent pressure of the pedal 58.

Variations may be resorted to within the scope of the invention, and portions of the improvements may be used without others.

Having thus described my invention, I claim:—

1. In an automobile, the combination with drive gears, and coöperating transmission gears, of a shifting device for each coöperating pair of said gears, a stationary member, a movable member passing through said devices, a locking device for each of said shifting devices normally holding it locked to said stationary member, means to unlock any one of said locking devices from said stationary member and lock it with its shifting device to said movable member, and means to actuate said movable member to move said locked shifting device therewith.

2. In an automobile, the combination with drive gears, and coöperating transmission gears, of a shifting device for each coöperating pair of said gears, a stationary member, a movable member passing through said devices, means to maintain said devices normally locked to said stationary member, means including a spring to unlock any one of said devices from said stationary member and lock it to said movable member, and means to actuate said movable member and move said locked device therewith under the action of the spring by a free and uncontrolled action independent of control by the means for imparting movement to said member in the opposite direction.

3. In an automobile, the combination with drive gears, and coöperating transmission gears, of a shifting device for each coöperating pair of said gears, a movable member passing through said devices, means to maintain said devices against shifting, means to lock any one of said devices to said movable member, and means to actuate said movable member and move said locked device therewith.

4. In an automobile, the combination with drive gears, and coöperating transmission gears, of a shifting device for each coöperating pair of said gears, a movable member passing through said devices, means to lock any one of said devices to said member, and means to actuate said movable member.

5. In an automobile, the combination with drive gears, and coöperating transmission gears, of a shifting device for each coöperating pair of said gears, a shiftable rod passing through said devices, means to lock any one of said devices to said rod, and means to actuate said rod.

6. In an automobile, the combination with a drive shaft, means to clutch and unclutch said shaft, drive gears, and coöperating transmission gears, of shifting devices for said gears, a movable member, means to lock any one of said gears to said member, means including a spring to impart a forward and backward movement to said member during the operation of the clutching and unclutching means, said spring acting to impart the backward movement by a free action independent of control by the means for imparting the forward movement.

7. In an automobile, the combination with a drive shaft, means to clutch and unclutch said shaft, drive gears, and coöperating transmission gears, of shifting devices for said gears, a movable member, means to lock any one of said gears to said member, means including a spring to impart a forward and backward movement to said member during the clutching operation, said spring actuating said member to couple the gears by a movement of said member in one direction free from the control by the device by which it is moved in the opposite direction.

8. In an automobile, the combination with drive gears, and coöperating transmission gears, of shifting devices for said gears, a movable member, means to lock any one of said devices to said member, a pedal adapted to be swung forwardly and backwardly, means to transmit forward and backward movement to said member by the forward movement of said pedal, said member moving said locked device therewith upon its movement in one direction, and said pedal returning without affecting said member.

9. In an automobile, the combination with drive gears, and coöperating transmission gears, of shifting devices for said gears, a movable member, means to lock any one of said devices to said member, a pedal adapted to be swung forwardly and backwardly, means to transmit a forward and backward movement to said member by said pedal when moving in one direction, and said pedal returning in the opposite direction without affecting said member.

10. In an automobile, the combination with drive gears, and coöperating transmission gears, of shifting devices for said gears, a movable member, means to lock any one of said devices to said member, a pedal adapted to be swung forwardly and backwardly, means to impart a forward and backward movement to said member when said pedal moves in one direction, and said member moving said locked device therewith upon its movement in one direction.

11. In an automobile, the combination with drive gears, and coöperating transmission gears, of shifting devices for said gears, a movable member, means to lock any one of said devices to said member, a pedal adapted to be swung forwardly and backwardly, and means to transmit a forward and backward movement to said member by the forward movement of said pedal.

12. In an automobile, the combination with drive gears, and coöperating transmission gears, of shifting devices for said gears, a movable member, means to lock any one of said devices to said member, a pedal adapted to swing forwardly and backwardly, and means to impart a forward and backward movement to said member by the movement of said pedal in one direction.

13. In an automobile, the combination with drive gears, and coöperating transmission gears, of shifting devices for said gears, a movable member, a pedal adapted to be swung in opposite directions, a spring-pressed ratchet cam-plate rotated by said pedal when moving in one direction, a coöperating ratchet cam-plate revolved by said former ratchet, a crank revolved by said latter ratchet, a connecting rod actuated by said crank to impart a to and fro movement to said member, means to lock any one of said devices to said member, and move the device therewith, a spring imparting a snap-movement to said member when moving said device, and said former ratchet revolving oppositely by the return movement of said pedal without actuating its coöperating ratchet.

14. In an automobile, the combination with drive gears, and coöperating transmission gears, of shifting devices for said gears, a movable member, a pedal adapted to be swung in opposite directions, a ratchet actuated by said pedal when moving in one direction, a coöperating ratchet actuated by said former ratchet, a crank revolved by said latter ratchet, a connecting rod actuated by said crank imparting a to and fro movement to said member, means to lock any one of said devices to said member and move the device therewith, a spring imparting a snap-movement to said member when moving said device, and said former ratchet being actuated oppositely without actuating its coöperating ratchet when said pedal is swung oppositely.

15. In an automobile, the combination with drive gears, and coöperating transmission gears, of shifting devices for said gears, a movable member, a pedal adapted to be swung in opposite directions, a ratchet actuated by said pedal when moving in one direction, a coöperating ratchet actuated by said former ratchet, a crank revolved by said latter ratchet, a connecting rod actuated by said crank imparting a to and fro movement to said member, and means to lock any one of said devices to said member and move the device therewith.

16. In an automobile, the combination with drive gears, and coöperating transmission gears, of shifting devices for said gears, a movable member, a pedal adapted to be swung in opposite directions, a ratchet actuated by said pedal when moving in one direction, a crank revolved by said ratchet a connecting rod actuated by said crank imparting a to and fro movement to said member, and means to lock any one of said devices to said member and move the device therewith.

17. In an automobile, the combination with drive gears, and coöperating transmission gears, of shifting devices for said gears, a movable member, a pedal adapted to be swung in opposite directions, a crank actuated by said pedal, a connecting rod actuated by said crank imparting a to and fro movement to said member, and means to lock any one of said devices to said member and move the device therewith.

18. In an automobile, the combination with drive gears, and coöperating transmission gears, of shifting devices for said gears, a movable member, means to lock any one of said devices to said member, a pedal adapted to be swung in opposite directions, a crank actuated by said pedal, a connecting rod actuated by said crank imparting a forward movement to said member, and a spring imparting a backward movement to said member.

19. In an automobile, the combination with drive gears, and coöperating transmission gears, of shifting devices for said gears, an operating pedal, a member connected to said pedal moved thereby, means for each of said devices to lock it to said member and means for pre-selecting the shifting device to be locked to said member prior to operation of the pedal.

20. In an automobile, the combination with drive gears, and coöperating transmission gears, of shifting devices for said gears, an operating pedal adapted to be swung in opposite directions, a member connected to said pedal moved thereby forwardly and backwardly when the pedal moves in one direction, and means for each of said devices to lock it to said member.

21. In an automobile, the combination with drive gears, and coöperating transmission gears, of shifting devices for said gears, an operating pedal adapted to be pressed and released, a member connected to said pedal moved thereby when the pedal is pressed, individually operable locking latches one for each of said devices for locking them to said member and means for pre-selecting the locking device for operation prior to the operation of the pedal.

22. In an automobile, the combination with drive gears, and coöperating transmission gears, of shifting devices for said gears, an operating pedal, and individually operable locking latches one for each of said devices for locking them to said member and means for pre-selecting the locking device for operation prior to the operation of the pedal.

23. In an automobile, the combination with drive gears, and coöperating transmission gears, of shifting devices for said gears, a selecting device for each of said devices, an operating pedal, and means to set any one of said selecting devices to connect any one of said shifting devices to said pedal prior to the operation of the pedal.

24. In an automobile, the combination with drive-gears, and transmission gears, of shifting devices for said gears, a movable member, and a selecting device for each of said shifting devices to lock it to said member; said selecting device including a spring-pressed latch on the shifting device normally maintaining it unlocked from said member, an operating rod adapted to be depressed, a spring compressed by said rod when depressed, a shoe pressed upon by said spring and bearing against said latch to lock the shifting device to said member, means to maintain said rod depressed and said spring compressed, and means to release and return said rod and relieve the pressure of said spring upon said latch when any rod of said other devices is depressed.

25. In an automobile, the combination with drive gears, and transmission gears, of shifting devices for said gears, a movable member, and a selecting device for each of said shifting devices to lock it to said member, said selecting device including a latch, an operating rod adapted to be depressed, a spring compressed by said rod when depressed, a shoe pressed upon by said spring and bearing against said latch to lock the shifting device to said member, means to maintain said rod depressed and said spring compressed, and means to release and return said rod and relieve the pressure of said spring upon said latch.

26. In an automobile, the combination with drive gears, and transmission gears, of shifting devices for said gears, a movable member, and a selecting device for each of said shifting devices to lock it to said member; said selecting device including a latch, a spring to actuate said latch to lock the shifting device to said member, and means to actuate said spring.

27. In an automobile, the combination with drive gears, and transmission gears, of shifting devices for said gears, a movable member, and a selecting device for each of said shifting devices to lock it to said member; said selecting device including a latch, a spring to actuate said latch to lock the shifting device to said member, an operating rod set to actuate said spring, means to maintain said rod set and said spring actuated, and means to release and return said rod when any rod of said other selecting devices is set.

28. In an automobile, the combination with drive gears, and transmission gears, of shifting devices for said gears, a movable member, and a selecting device for each of said shifting devices to lock it to said member; said selecting device including a latch, a spring to actuate said latch to lock the shifting device to said member, means set to actuate said spring, means to maintain said actuating means set and said spring actuated, and means to release and return said actuating means.

29. In an automobile, the combination with drive gears, and transmission gears, of shifting devices for said gears, a movable member, and a selecting device for each of said shifting devices to lock it to said member; said selecting device including a latch, a spring to actuate said latch to lock the shifting device to said member, means to actuate said spring, and means to maintain said actuating means set and said spring actuated.

30. In an automobile, the combination with drive gears, and transmission gears, of shifting devices for said gears, a movable member, a selecting device for each of said shifting devices to lock it to said member, manipulating means for said selecting devices, and means to lock said manipulating means to prevent unauthorized tampering with said shifting devices.

31. In an automobile, the combination with drive gears, and transmission gears, of shifting devices for said gears, a movable member, and a selecting device for each of said shifting devices to lock it to said member; said selecting device including a latch, a spring to actuate said latch to lock the shifting device to said member, an operating rod set to actuate said spring, means to maintain said rod set and said spring actuated, means to release and return said rod when any rod of said other selecting devices is set, and means to lock said rods to prevent unauthorized manipulation therewith.

32. In an automobile, the combination with drive gears, and transmission gears, of shifting devices for said gears, a movable member, means to lock any one of said devices to said member, manipulating means for said locking means, and means to lock said manipulating means to prevent unauthorized shifting of said devices.

33. In an automobile, the combination with drive gears, and transmission gears, of shifting devices for said gears, a stationary member, a movable member, and a selecting device for each of said shifting devices; said selecting device including a latch normally locking its shifting device to said stationary member, an operating rod adaptable to be depressed, means to maintain said rod depressed, a spring compressed by said rod when depressed, a shoe pressed upon by said spring bearing against said latch to unlock said shifting device from said stationary member and lock it to said movable member, means to maintain said rod depressed and said spring compressed, and means to release and return said rod and relieve the pressure of said spring when any rod of said other selecting devices is depressed.

34. In an automobile, the combination with drive gears, and transmission gears, of shifting devices for said gears, a stationary member, a movable member, and a selecting device for each of said shifting devices; said selecting device including a latch normally locking its shifting device to said stationary member, a spring to actuate said latch to unlock said shifting device from said stationary member and lock it to said movable member, an operating rod set to actuate said spring, means to maintain said rod set and said spring actuated, and means to release and return said rod when any rod of said other selecting devices is set.

35. In an automobile, the combination with drive gears, and transmission gears, of shifting devices for said gears, a stationary member, a movable member, and a selecting device for each of said shifting devices; said selecting device including a latch normally locking its shifting device to said stationary member, a spring to actuate said latch to unlock said shifting device from said stationary member and lock it to said movable member, means set to actuate said spring, means to maintain said actuating means set and said spring actuated, and means to release and return said actuating means.

36. In an automobile, the combination with drive gears, and transmission gears, of shifting devices for said gears, a stationary member, a movable member, and a selecting device for each of said shifting devices; said selecting device including a latch normally locking its shifting device to said stationary member, a spring to actuate said latch to unlock said shifting device from said stationary member and lock it to said movable member, an operating rod set to actuate said spring, means to maintain said rod set and said spring actuated, means to release and return said rod when any one of said other selecting devices is set, and means to lock said rods to prevent unauthorized unlocking of said shifting devices from said stationary member.

37. In an automobile, the combination with drive gears, and transmission gears, of shifting devices for said gears, a stationary member, a movable member, means to normally lock said devices to said stationary member, means to unlock any one of said devices from said stationary member and lock it to said movable member, manipulating means for said locking means, and means to lock said manipulating means to prevent unauthorized shifting of said devices.

38. In an automobile, the combination with drive gears, and transmission gears, of shifting devices for said gears, a movable member, and a selecting device for each of said shifting devices to lock it to said member; said selecting device including a locking device, a spring to actuate said locking device to lock the shifting device to said member, and means to actuate said spring.

39. In an automobile, the combination with drive gears, and transmission gears, of shifting devices for said gears, a movable member, and a selecting device for each of said shifting devices to lock it to said member; said selecting device including a locking device, a spring to actuate said locking device to lock the shifting device to said member, means set to actuate said spring, means to maintain said actuating means set and said spring actuated, and means to release and return said actuating means.

40. In an automobile, the combination with drive gears, and transmission gears, of shifting devices for said gears, selecting devices for said shifting devices, and means for locking said selecting devices to prevent unauthorized shifting of said devices.

41. In an automobile, the combination with drive gears, and transmission gears, of shifting devices for said gears, selecting devices for said shifting devices, manipulating means for said selecting devices, and means for locking said manipulating means to prevent unauthorized shifting of said devices.

42. In an automobile, the combination with drive gears, and coöperating transmission gears, of a shifting device for each coöperating pair of said gears, a movable member, means to lock any one of said devices to said member, an actuating member for said movable member to move the same in one direction and means for moving the movable member in the other direction independent of control by said actuating member.

43. In an automobile, the combination with drive gears, and coöperating transmission gears, of a shifting device for each coöperating pair of said gears, a movable member, means to lock any of said devices to said member, an actuating member for said movable member to move the same in one direction and means for moving the movable member in the other direction independent of control by said actuating member.

44. In an automobile, the combination with drive gears, and coöperating transmission gears, of a shifting device for each coöperating pair of said gears, a movable member, means to lock any one of said devices to said member, an actuating member for said movable member, and means to move said actuating member either independently of, or together with said movable member in one direction, and either independently of, or together with said movable member in an opposite direction.

45. In an automobile, the combination with drive gears, and coöperating transmission gears, of a shifting device for each coöperating pair of said gears, a movable member, means to lock any one of said devices to said member, an actuating member for said movable member to move the same in one direction and means for moving the movable member in the other direction independent of control by said actuating member.

46. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, an actuating member for said movable member operated by said clutch operating means to move the same in one direction and means for moving the movable member in the other direction independent of control by said actuating member.

47. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, an actuating member for said movable member operated by said clutch operating means, to move the same in one direction and means for moving the movable member in the other direction independent of control by said actuating member.

48. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, an actuating member for said movable member operated by said clutch-operating means, to move the same in one direction and means for moving the movable member in the other direction independent of control by said actuating member.

49. In an automobile, the combination with a drive shaft, means to clutch and unclutch said shaft, means to operate said clutching means, drive gears, and coöperating transmission gears, of a shifting device for each coöperating pair of said gears, a movable member, means to lock any one of said devices to said member, an actuating member for said movable member operated by said clutch operating means, to move the same in one direction and means for moving the movable member in the other direction independent of control by said actuating member.

50. In an automobile, the combination with a drive shaft, a clutch therefor, a pedal for operating said clutch, drive gears, and coöperating transmission gears, of a shifting device for each coöperating pair of said gears, a movable member, means to lock any one of said devices to said member, an actuating member for said movable member operated by said pedal, to move the same in one direction and means for moving the movable member in the other direction independent of control by said actuating member.

51. In an automobile, the combination with a drive shaft, a clutch therefor and clutch operating means, of a shiftable transmission gear and a spring for meshing said gear, and means for compressing said spring by the action of the clutch operating mechanism, said spring operating in meshing the gear by a free and uncontrolled action of the spring independent of control by the clutch operating mechanism.

52. In an automobile, the combination with drive gears, of a shifting device for each coöperating pair of said gears, a movable member, means to lock any one of said devices to said member, a spring for moving said member and actuating means for placing said spring under compression, the said actuating means permitting free and uncontrolled action of the spring in moving said member.

53. In an automobile, the combination with a drive shaft, a clutch therefor, of clutch operating means, drive gears, coöperating transmission gears, a shifting device for each coöperating pair of said gears, a movable member, means to lock any one of said devices to said member, a spring for moving said member and means to actuate said spring operated by said clutch operating means, said actuating means permitting free and uncontrolled action of the spring independent of the clutch operating means when the spring moves said member.

54. In an automobile, the combination with drive gears and transmission gears for driving the wheels, of shifting devices for said gears, a movable member, means to lock any one of said devices to said member, a spring for moving said member and means to actuate said spring, said spring being permitted to move said member independent of the control of said spring actuating means.

55. In an automobile, the combination with drive gears and transmission gears for driving the wheels, of a movable member, means to lock any one of said gears to said member, a spring for moving said member and means for actuating said member, said actuating means when operated moving said member and compressing said spring and then releasing said member to permit said spring to move the member free and uncontrolled by said actuating means.

56. In an automobile, the combination with drive gears and transmission gears for driving the wheels, of a movable member, means to lock any one of said gears to said member, a spring for moving said member, mechanism for actuating said member, said mechanism when operated moving said member and compressing said spring and then releasing said member to permit said spring to move said member independent of control.

Signed at the city of New York, in the county of New York, and State of New York, this 22nd day of May, A. D. 1914.

MERION J. HUGGINS.

Witnesses:
CHAS. W. LA RUE,
B. ROMAN.